United States Patent [19]

White

[11] Patent Number: 5,202,918
[45] Date of Patent: Apr. 13, 1993

[54] DUPLEX TRANSDUCER FOR SIMULTANEOUS VOICE BROADCAST AND RECEPTION

[75] Inventor: Donald R. White, Kansas City, Mo.

[73] Assignee: Maxcom Electronics, Inc., Kansas City, Mo.

[21] Appl. No.: 865,205

[22] Filed: Apr. 8, 1992

Related U.S. Application Data

[63] Continuation of Ser. No. 703,391, May 21, 1991, abandoned.

[51] Int. Cl.$^5$ .............................................. H04M 1/60
[52] U.S. Cl. ...................................... 379/390; 381/83; 381/93
[58] Field of Search ............... 379/387, 388, 390, 395, 379/406, 420, 202, 161, 410, 411; 381/71, 89, 90, 91, 94

[56] References Cited

U.S. PATENT DOCUMENTS

| | | | |
|---|---|---|---|
| 4,908,855 | 3/1990 | Ohga et al. | 379/387 |
| 4,932,063 | 5/1990 | Nakamura | 381/94 |
| 5,027,393 | 6/1991 | Yamamura et al. | 379/410 |

*Primary Examiner*—James L. Dwyer
*Assistant Examiner*—Magdy Shehata
*Attorney, Agent, or Firm*—Hovey, Williams, Timmons & Collins

[57] ABSTRACT

A preferred duplex communications device includes a speaker for transmitting a signal received from a remote source, first and second microphones for transducing received acoustical signals wherein the first microphone is positioned significantly closer to the speaker than the second microphone so that the first microphone receives significantly more acoustical signal strength from the speaker than the second microphone. A first amplifier is connected to the first microphone and a second amplifier is connected to the second microphone wherein the second amplifier has a gain relative to a gain of the first amplifier such that the output signals of the first and second amplifiers are generally equal with respect to signals received by way of the speaker. A filter is then connected to the outputs of the first and second amplifiers to filter the signals transduced from the speaker thereby preventing transmission to the remote source of essentially all of the signals from the speaker.

15 Claims, 3 Drawing Sheets

DUPLEX TRANSDUCER FOR SIMULTANEOUS VOICE BROADCAST AND RECEPTION

This is a continuation of application Ser. No. 07/703,391, filed on May 21, 1991 now abandoned.

BACKGROUND OF THE INVENTION

1. Field of the Invention

The present invention relates generally to a device for providing duplex hands-free communication and more particularly, to providing duplex communication as a speaker telephone.

2. Description of the Prior Art

Prior art speaker phones for hands-free communication typically use fast switching circuitry to alternate between broadcasting and receiving. If this switching did not take place an annoying feedback squeal would occur. The switching, however, can be annoying in itself because the circuitry compares the strength of the broadcast and receive signals and allows the strongest signal to be transmitted. This means the parties which are communicating must take turns talking which can be awkward.

To avoid the need for switching while also preventing feedback squeal, other approaches employing a speaker and one or two microphones have been tried using various cancellation techniques. These attempts have thus far been unsatisfactory because of phase changes occurring between cancellation signals when connected to different transmission paths, or because return losses are not great enough to permit a satisfactory speaker acoustical level without inducing loop oscillations.

Another approach to duplex systems has been to use an echo cancellation scheme wherein the system generates an estimate of the echo and subtracts the estimate from the signal containing the echo. The estimate of the echo, however, is not always accurate and under certain conditions a feedback squeal may still be generated.

Summary of the Invention

The problems outlined above are solved and an advance in the state of the art provided by the duplex communication devices of the present invention. More particularly, the device hereof provides duplex communication without feedback squeal and without the need for switching.

A preferred duplex hands-free communication device includes a speaker for conveying a signal received from a remote source, first and second microphones for transducing received acoustical signals wherein the first microphone is positioned significantly closer to the speaker than the second microphone so that the first microphone receives significantly more acoustical signal strength from the speaker than the second microphone. A first amplifier is connected to the first microphone and a second amplifier is connected to the second microphone wherein the second amplifier has a gain relative to a gain of the first amplifier such that the output signals of the first and second amplifiers are generally equal with respect to signals received by way of the speaker. A filter is then connected to the outputs of the first and second amplifiers to prevent the transmission to the remote source of essentially all of the signals from the speaker.

Another preferred duplex hands-free communication device includes a transducer for transducing signals received from a remote location by way of a communication link and for transducing acoustical signals received from a user wherein the user signals are to be transmitted to the remote location, and a matching circuit for matching the electrical characteristics of the transducer wherein the remote signals are applied essentially equally to the transducer and the matching circuit. A filter is connected to the transducer and the matching circuit to prevent the remote signals from being transmitted back to the remote location and to allow the transmission of the user signals to the remote location.

DETAILED DESCRIPTION OF THE PREFERRED EMBODIMENTS

Figure 1:
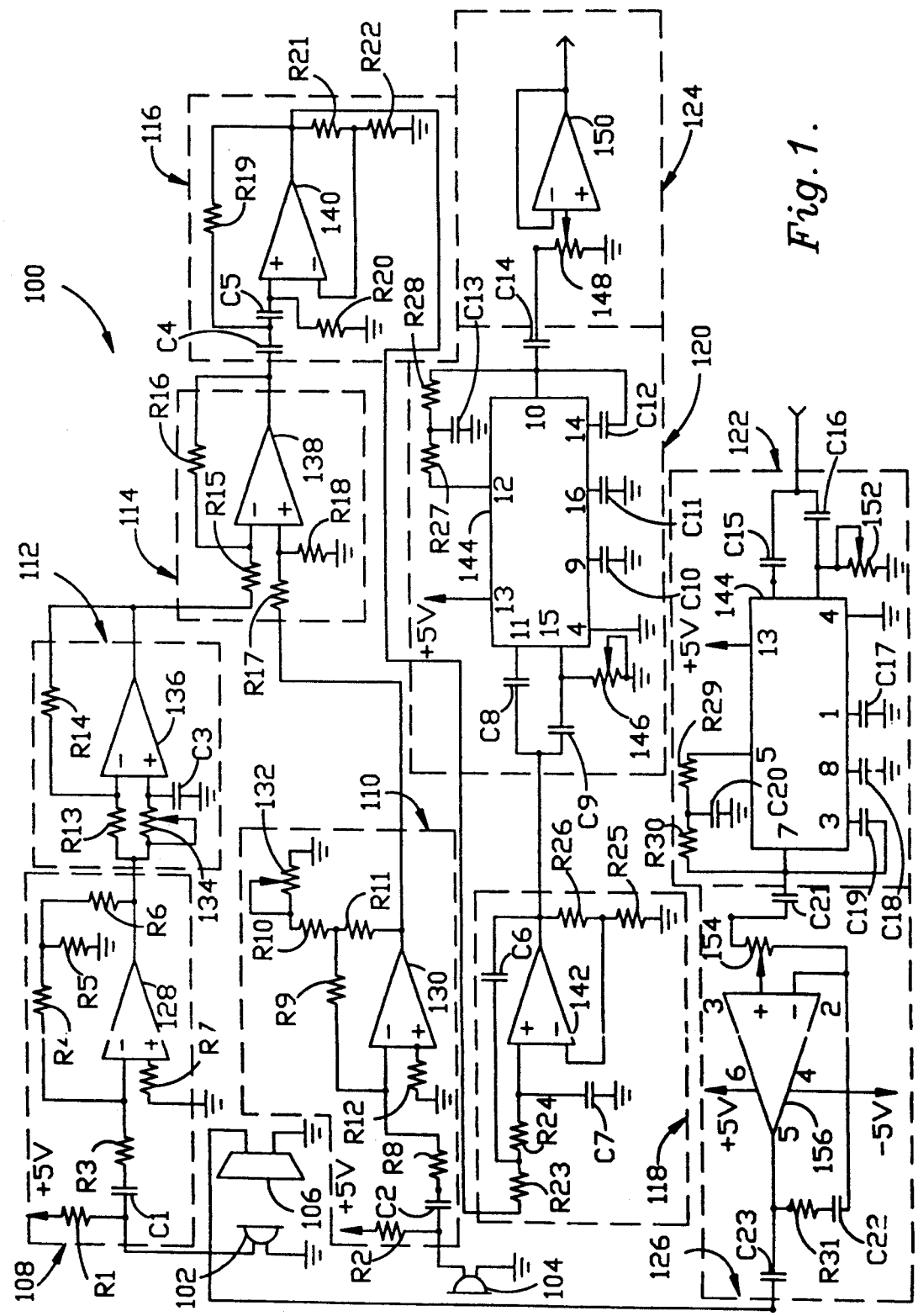
FIG. 1 is a schematic diagram of a preferred embodiment in accordance with the present invention.

A schematic diagram of a preferred embodiment of the present invention is shown in FIG. 1. A duplex transducer system 100 includes microphones 102 and 104, speaker 106, gain circuits 108 and 110, phase shifter 112, differential amplifier 114, high pass filter 116, low pass filter 118, automatic level controls 120 and 122, line driver 124 and speaker driver 126 all connected as shown in FIG. 1.

In general, duplex transducer system 100 allows simultaneous broadcast and reception of acoustical signals in a hands-free configuration without annoying feedback. Microphone 102 is positioned at a distance relative to microphone 104 such that microphone 102 transduces more acoustical signal strength from speaker 106. The transduced signals from microphones 102 and 104 are then applied to gain circuits 108 and 110 respectively, with gain circuit 110 having a higher gain than gain circuit 108 such that the amplitudes of the transduced signals from speaker 106 are essentially equal at the outputs of gain circuits 108 and 110. A fixed phase difference between the acoustical signals transduced by microphones 108 and 110 exists because of the distance separating the microphones.

In order to bring the transduced speaker signals into phase, the output of gain circuit 108 is applied to phase shifter 112 so that, at the outputs of phase shifter 112 and gain circuit 110, the transduced speaker signals are equal in amplitude and phase. Next, phase shifter 112 output and gain circuit 110 output are applied to inverting and noninverting input terminals of differential amplifier 114, respectively. Through common mode rejection of differential amplifier 114, the transduced speaker signals are then substantially reduced which eliminates unwanted feedback squeal by preventing received signal oscillations in the communication loop.

A user's voice is picked up essentially equally by microphones 102 and 104. Therefore, the transduced user voice signals at the output of gain circuit 110 will be significantly larger than at the output of gain circuit 108. Phase shifter 112 introduces a further difference between the transduced user voice signals but not enough for the signals to be in differential mode. At the output of differential amplifier 114, the transduced user signals will be slightly larger than at the output of gain circuit 110. Duplex transducer system 100 produces user signals which are 10-15 dB greater than the rejected speaker signals.

High pass filter 116 and low pass filter 118 eliminate high and low resonant frequencies and automatic level controls 120, 122 maintain the signal strengths of the outgoing and incoming signals respectively at an essentially constant level. Line driver 124 matches the voltage of the communication line to which the transducer device is to be attached, and speaker driver 126 drives speaker 106.

More particularly, microphone 102, preferably an electret type microphone, has a positive and a negative terminal, one of which is grounded and the other connected to one side of resistor R1 (1 kΩ) and to the positive side of capacitor C1 (1 μf) of gain circuit 108. The other side of resistor R1 is connected to +5 v.d.c. of an appropriate power supply (not shown). Similarly, microphone 104, which is also preferably an electret type microphone has one of its terminals grounded and the other connected to one side of resistor R2 (1 kΩ) and to one side of capacitor C2 (1 μf) of gain circuit 110. The connections of microphones 102 and 104 correspond with respect to their positive and negative terminals in order to keep the transduced signals in phase.

Gain circuit 108 is an inverting amplifier circuit. The other side of capacitor C1 is connected to one side of a resistor R3 (100 kΩ) and the other side of R3 is connected to one side of a resistor R4 (1 MΩ) and to the inverting input terminal of an operational amplifier (op amp) 128, which is preferably a TL084 Bifet op amp from Texas Instruments. The other side of resistor R4 is connected to one side of resistors R5 (10 kΩ) and R6 (100 kΩ) with the other side of resistor R5 grounded and the other side of resistor R6 connected to the output terminal of op amp 128. One side of a resistor R7 (100 kΩ) is connected to a noninverting input terminal of op amp 128 and the other side of R7 is grounded. This configuration gives gain circuit 108 a gain of approximately 100.

The configuration of gain circuit 110 resistors R8-R12 (100 kΩ, 1 MΩ, 2.2 kΩ, 470 kΩ and 100 kΩ, respectively) is the same as that of gain circuit 108 resistors R3-R7 except the resistor values are such that a gain of approximately 400 is achieved at an output terminal of op amp 130 (TL084). Also, one side of potentiometer 132 (10 kΩ) is connected to the ground side of resistor R10 and the other side of potentiometer 132 is grounded. Potentiometer 132 allows adjustment to equalize the magnitudes of the transduced signals from speaker 106. At the output terminals of op amps 128 and 130 the transduced signals from speaker 106 substantially equal in amplitude but exhibit a phase difference caused by the relative differences in distance between microphones 102, 104 and speaker 106.

Figure 2:
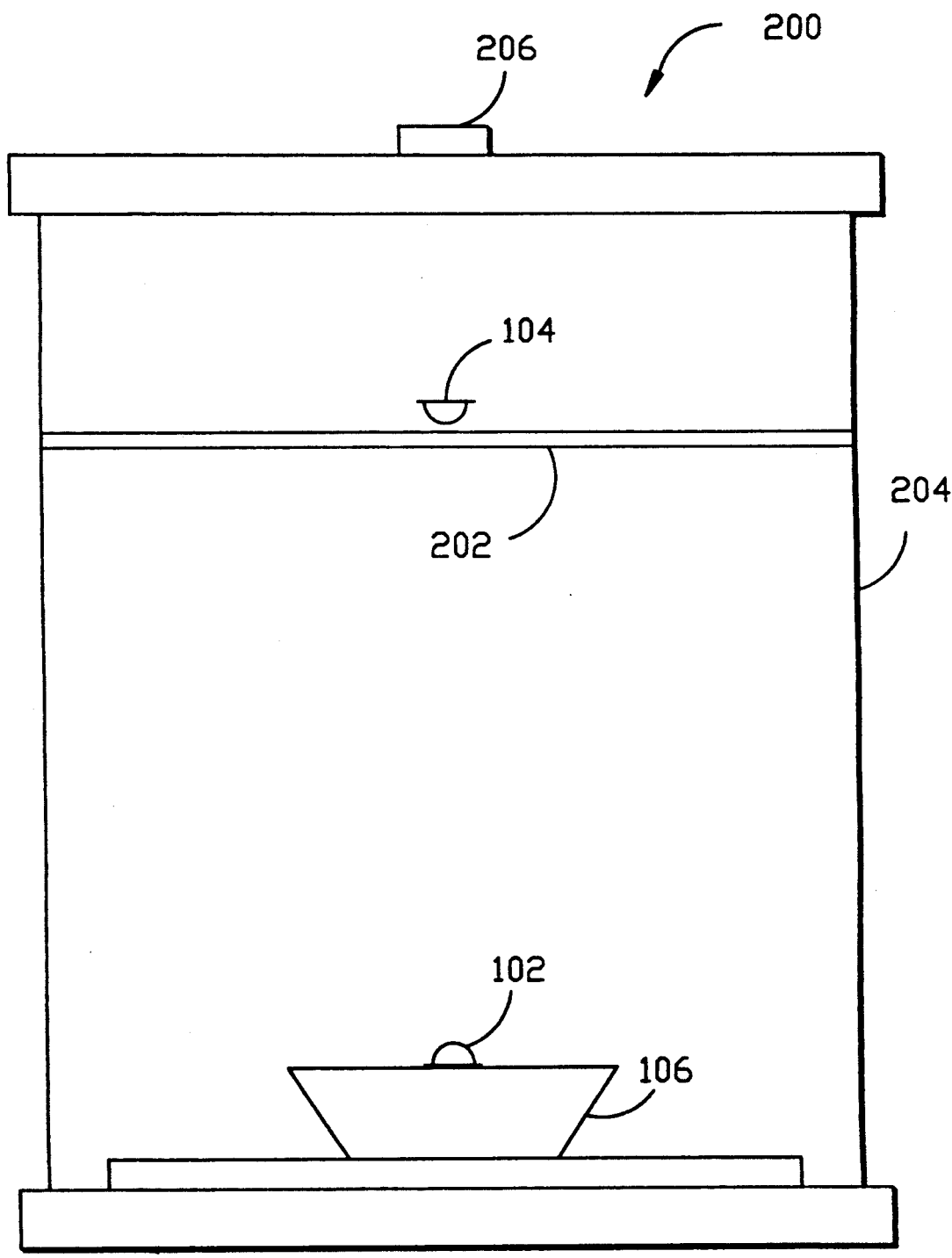
FIG. 2 is a schematic representation of a physical construction of the preferred embodiment of FIG. 1.

Preferably, microphone 102 is less than an inch in front of speaker 106, and microphone 104 is placed five to seven inches in front of speaker 106, as shown in FIG. 2. The preferred physical construction of duplex transducer system 100 is designated by the numeral 200 in FIG. 2. An acoustical attenuator 202 such as polystyrene is placed between microphones 102 and 104 to provide further isolation of microphone 104 from the signals generated by speaker 106. Duplex transducer system 100 is preferably completely surrounded by an acoustical grill 204 which allows microphones 102 and 104 to receive a user's voice equally. A push on-push off switch 206 is provided for activation of the device.

To compensate for the phase difference between the transduced speaker signals at the output terminals of op amps 128 and 130, phase shifter 112 is connected to one of the output terminals of gain circuits 108 and 110. FIG. 1 shows phase shifter 112 connected to gain circuit 108, although it could be connected to gain circuit 110 with equally satisfactory results. Phase shifter 112 includes resistor R13 (100 kΩ) one side of which is connected to the output terminal of op amp 128 and to one side of a potentiometer 134 (50 KΩ). Potentiometer 134 allows adjustment to enable the phase of the transduced speaker signals at the output of gain circuit 110 and phase shifter 112 to be aligned. The other side of resistor R13 is connected to one side of a resistor R14 (100 KΩ) and to an inverting input terminal of op amp 136 (TL084). The other side of potentiometer 134 is connected to one side of capacitor C3 (0.01 μf) and to the noninverting input terminal of op amp 136. The other side of resistor R14 is connected to an output of op amp 136 and the other side of capacitor C3 is grounded. The amount of phase shift necessary generally varies between approximately 20-30 degrees.

The signals from phase shifter 112 are applied to the negative input of differential amplifier 114 and the signals from gain circuit 110 are then supplied to the positive terminal of differential amplifier 114. One side of resistor R15 (100 KΩ) of differential amplifier 114 is connected to the output terminal of op amp 136, and the other side of resistor R15 is connected to one side of a resistor R16 (100 kΩ) and to an inverting input terminal of op amp 138 (TL084). The output terminal of op amp 130 is connected to one side of resistor R17 (100 kΩ), and the other side of R17 is connected to one side of a resistor R18 (100 kΩ) and to a noninverting input terminal of op amp 138. The other side of resistor R18 is grounded and the other side of resistor R16 is connected to an output terminal of op amp 138 and one side of capacitor C4 (0.01 μf) of high pass filter 116.

The equal and in phase transduced speaker signals from phase shifter 112 and gain circuit 110 are fed into differential amplifier 114 so that, at the output of op amp 138, the transduced speaker signals are significantly reduced due to the common mode rejection of op amp 138. Any other acoustic signals which have been transduced will be present at the output of op amp 138 because of the large gain of gain circuit 110. It should now be apparent to those skilled in the art that the annoying squeal caused from feedback associated with acoustical signals generated by speaker 106 is substantially eliminated by duplex transducer system 100 without the need for switching between receive and broadcast modes.

The output of differential amplifier 114 is then connected to the input of high pass filter 116. The other side of capacitor C4 is connected to one side of resistor R19 (56 KΩ) and to one side of capacitor C5 (0.01 μf). The other side of capacitor C5 is connected to one side of resistor R20 and to a noninverting input terminal of an op amp 140 (TL084) and the other side of resistor R20 is grounded. The output terminal of op amp 140 is connected to the other side of resistor R19, to one side of resistor R21 (47 kΩ) and to one side of resistor R23 (4.7 kΩ) of low pass filter 118. Resistor R22 is grounded and connected to the other side of resistor R21 and to an inverting input terminal of op amp 140. High pass filter 116 eliminates unwanted low frequency signals and low pass filter 118 described below eliminates unwanted high frequency signals.

One side of resistor R24 (4.7 kΩ) of low pass filter 118 is connected to the other side of resistor R23 and one side of capacitor C6 (0.01 μf). The other side of resistor R24 is connected to one side of capacitor C7 and a noninverting input terminal of op amp 142 (TL084) and the other side of capacitor C6 is connected to an output terminal of op amp 142. Resistor R25 (56 kΩ) on one side is connected to ground and on the other side to one side of resistor R26 (47 kΩ) and to an inverting input terminal of op amp 142. The other side of resistor R26 is connected to the output terminal of op amp 142.

Automatic level control (ALC) 120 is a conventional ALC using a Signetics Compander NE570. This exact circuit is described in the Signetics data book for the NE570. ALC 120 includes one side of capacitors C8 (2.2 μf) and C9 (2.2 μf) connected to the output terminal of op amp 142. The other side of capacitor C8 is connected to pin 11 of a compander 144 and the other side of capacitor C9 is connected to pin 15 of compander 144 and one side of a potentiometer 146. Ground is connected to the other side of potentiometer 146. Potentiometer 146 provides a "presence" control for duplex transducer system 100 by which the amount of background signal the user wants to be transmitted is controlled by adjusting potentiometer 146. The more background signal transmitted the greater the "presence". Other connections to compander 144 include capacitors C10-C14 (200pf, 1 μf, 2.2 μf, 10 μf and 2.2 μf, respectively) and resistors R27 and R28 (33kΩ each) as shown in FIG. 1.

One side of capacitor C14 is connected to one side of potentiometer 148 (40kΩ) which allows adjustment for line driver 124 in order to match the voltage of the output line. The other side of potentiometer 148 is connected to the noninverting input terminal of op amp 150 and the inverting input terminal of op amp 150 is connected to the output terminal of op amp 150. The output terminal of op amp 150 is then connected to a transmission medium.

An incoming signal is received at ALC 122 which is the identical to ALC 120 described above. ALC 122 includes compander 144, capacitors C15-C21, potentiometer 152 and resistors R29 and R30 with all the values corresponding to those of ALC 120.

The output of ALC 122 is connected to speaker driver 126 at potentiometer 154, which provides volume control for speaker 106. Potentiometer 154 is also connected to capacitor C21, a noninverting input terminal of power amplifier 156 (preferably an LM386 from National Semiconductor) and an inverting input terminal of power amplifier 156. The inverting input terminal of power amplifier 156 is also connected to −5 v.d.c. and to one side of capacitor C22 (0.05 μf). The other side of capacitor C22 is connected to one side of resistor R31 (10Ω), and the other side of R31 is connected to an output terminal of power amplifier 156 and to one side of capacitor C23 (50 μf). Speaker 106 is connected to the other side of capacitor C23. Potentiometer 154 is an external control which adjusts the volume of the received signal produced by speaker 106.

COMMON TRANSDUCER EMBODIMENT

Figure 3:
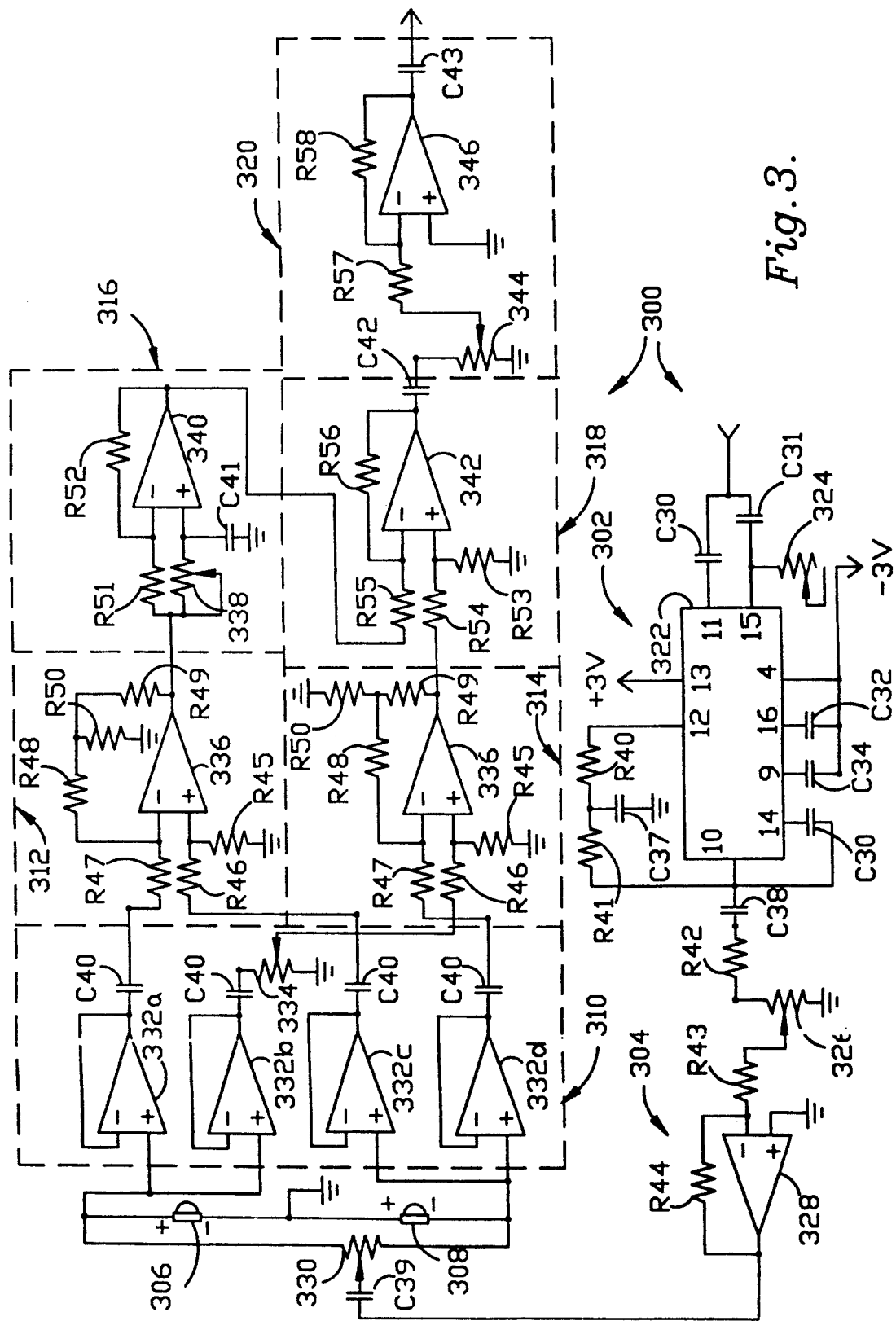
FIG. 3 is a schematic diagram of a second embodiment in accordance with the present invention.

Referring now to FIG. 3, a common transducer system 300 is shown. System 300 includes an automatic level control (ALC) 302, a transducer driver 304, a duplex transducer 306 and an equivalent circuit 308 (shown here as a second duplex transducer), buffers 310, differential amplifiers 312 and 314, phase shifter 316, differential amplifier 318 and line driver 320.

In general, system 300 receives signals at ALC 302 which maintains the incoming signals (hereinafter referred to as received signals) at an essentially constant level. The received signals are then applied to transducer driver 304 which applies the received signals equally across duplex transducer 306 and its equivalent circuit 308 to produce acoustical signals. Driver 304 also applies the received signals to the four buffers 310 to provide isolation for the signals applied to buffers 310. Transducer 306 also transduces acoustical signals received from a user which are then applied to buffers 310.

Buffers 310 also receive user generated signals from duplex transducer 306 and possibly from equivalent circuit 308 if circuit 308 is a second duplex transducer. It is desirable to use a second duplex transducer as equivalent circuit 308 in high noise situations. Otherwise, equivalent circuit 308 may be a circuit which approximates the characteristics of transducer 306.

The received signals are applied to differential amplifiers 312 and 314 in common mode so that the received signals are attenuated. Any transduced user signals are applied in differential mode because circuit 308 is connected to buffer circuits 310 with a polarity opposite of transducer 306. With this arrangement, the received signals are greatly reduced and the user signals increased at the outputs of differential amplifiers 312 and 314 compared to the signals at the inputs to the amplifiers.

Even though the received signals are greatly reduced, another stage of filtering is required in order to obtain user signals which are sufficiently large with respect to the received signals. Therefore, phase shifter 316 is connected to the output of one of differential amplifiers 312 and 314 in order to bring the received signals present at the output terminals thereof into phase with respect to each other. Phase shifter 316, as shown in FIG. 3, is connected to the output terminal of differential amplifier 312 but it could be connected to differential amplifier 314 and achieve equally satisfactory results. The output terminals of phase shifter 316 and differential amplifier 314 are connected to differential amplifier 318 and the received signals are even further reduced because they are again applied in common mode.

The user signals, on the other hand, will still be in differential mode and therefore larger at the output terminal of differential amplifier 318 than at the input terminals. The user signals are then applied to line driver 320 and transmitted across a communication medium.

In more detail, ALC 302 is a conventional ALC using a Signetics Compander NE570. This exact circuit is described in the Signetics data book for the NE570. ALC 302 includes one side of capacitors C30 (2.2 μf) and C31 (2.2 μf) connected to an incoming communication medium. The other side of capacitor C30 is connected to pin 11 of a compander 322 and the other side of capacitor C31 is connected to pin 15 of compander 322 and to one side of potentiometer 324. Potentiometer 324 provides a "presence" control for common transducer system 300 controlling the amount of background signal which the user wants to be transmitted. The more background signal transmitted the greater the "presence". Other connections to compander 322 include capacitors C32-C38 (1 μf, 200 pf 2.2 μf, 10 μf and 2.2

μf, respectively) and resistors R40 and R41 (33 kΩ each), as shown in FIG. 3.

Transducer driver 304 is connected to ALC 302 at one side of resistor R42 (27 kΩ). The other side of resistor R42 is connected to potentiometer 326 which controls the volume of the received signals. Potentiometer 326 is also connected to one side of resistor R43 (100 kΩ). The other side of resistor R43 is connected to one side of resistor R44 (220 kΩ) and an inverting input terminal of operational amplifier 328 (preferably, an LM386 from National Semiconductor). Operational amplifier 328 provides the amplification necessary to drive duplex transducer 306 and equivalent circuit 308, if necessary. A noninverting input termimnal of amplifier 328 is grounded and the other side of resistor R44 is connected to an output terminal of amplifier 328 and to one side of capacitor C39 (1 μf). The other side of capacitor C39 is connected to potentiometer 330 which in turn is connected to duplex transducer 306, equivalent circuit 308 and buffer circuits 310, as shown in FIG. 3. Potentiometer 330 is adjusted to ensure that the received signals are applied equally to buffers 310, transducer 306 and circuit 308.

If equivalent circuit 308 is a second duplex transducer then it needs to be connected to potentiometer 330 electrically opposite with respect to duplex transducer 306. This is so that user signals are transduced by circuit 308 and transducer 306 180 degrees out of phase with respect to each other, which allows the transduced user signals to be applied to differential amplifier circuits in differential mode. Duplex transducer 306 can be any one of a variety of different types of transducers depending upon the particular application such as a conventional bone conduction transducer which is placed in a user's ear or a flat plane piezo transducer.

Buffers 310 are conventional signal isolation circuits to prevent interference with the signals applied to differential amplifiers 312 and 314. All the buffers include op amps 332 (TL084) and capacitors C40 (1 μf) with an inverting input terminal of op amps 332 connected to the respective output terminals thereof. Noninverting input terminals of buffers 332a and 332b are connected to duplex transducer 306 and noninverting terminals of buffers 332c and 332d are connected to equivalent circuit 308. The output terminal of buffer 332c is connected to a noninverting input terminal of differential amplifier 312, and buffer 332d is connected to an inverting input terminal of differential amplifier 314. The output terminal of buffer 332a is connected to an inverting input terminal of differential amplifier 312. The output terminal of buffer 332b is connected to potentiometer 334.

Potentiometer 334 is also connected to a noninverting input terminal of differential amplifier 314 and is adjusted to reduce the magnitude of the signals from the output of buffer 310 in order to allow the signals applied to the inverting input terminal of differential amplifier 314 to control the output of differential amplifier 314. Differential amplifiers 312 and 314 are identical, each have gains of approximately 470 and include resistors R45-R50 (100 kΩ, 100 kΩ, 100 kΩ, 1 MΩ, 470 kΩ and 10 kΩ, respectively) and op amp 336 (TL084) connected as shown in FIG. 3. As explained above, the received signals are applied to differential amplifiers 312 and 314 in common mode and therefore are greatly reduced while any user signals from transducer 306 and equivalent circuit 308 will be in differential mode and therefore amplified. It is noted that if equivalent circuit 308 is not a transducer but is instead an equivalent circuit to match transducer 306, then the signals from transducer 306 will be passed through differential amplifiers 312 and 314 without being substantially increased by any signals from circuit 308.

Though the user signals have been amplified and the received signals reduced, there still needs to be further filtering of the received signals to achieve a sufficiently large user signal compared to the received signal. This is because a received signal for a user to hear comfortably with a bone conduction transducer, for example, must be on the order of 50 to 100 millivolts but the user signal will only be approximately 1 millivolt at the output of the bone conduction transducer. Therefore, phase shifter 316 is connected to differential amplifier 312 to bring the remaining received signals of differential amplifier 312 into phase with the received signals of differential amplifier 314. This phase shift is approximately 3-5 degrees which allows the user signals to remain in differential mode so that the user signals are again amplified and the received signals reduced after passing through differential amplifier 318.

Phase shifter 316 includes resistor R51 (100 kΩ) one side of which is connected to the output terminal of differential amplifier circuit 312 and to potentiometer 338. The other side of resistor R51 is connected to one side of resistor R52 (100 kΩ) and an inverting input terminal of op amp 340 (TL084). Potentiometer 338, which allows the phase to be adjusted, is also connected to one side of capacitor C41 and a noninverting input terminal of op amp 340. The other side of capacitor C41 is grounded, and the other side of resistor R52 is connected to an output terminal of op amp 340 and to an inverting input terminal of differential amplifier 318.

Differential amplifier 318 includes resistors R53-R56 (each 100 kΩ), op amp 342 (TL084) and capacitor C42 (1 μf) connected as shown in FIG. 3. Potentiometer 344 of line driver 320 is connected to one side of capacitor C42 and is adjusted to match the output line voltage. Line driver 320 further includes one side of resistor R57 (100 kΩ) connected to potentiometer 344 and the other side to resistor R58 (220 kΩ) and an inverting input terminal of op amp 346 (TL084). The other side of resistor R58 is connected to an output terminal of op amp 346 and one side of a capacitor C43. A noninverting input terminal of op amp 346 is grounded and the other side of capacitor C43 is connected to the output line.

As those skilled in the art will appreciate, it is noted that substitutions may be made for the preferred embodiments and equivalents employed herein without departing from the scope of the present invention as recited in the claims. For example, microphone 104 could be replaced with two or more microphones in order to receive more user signal at gain circuit 110. Also, other configurations of microphone 104 with respect to speaker 106 could be employed such as having microphone 104 positioned adjacent speaker 106. In addition, potentiometer 334 could be eliminated which would result in phase shifter 316 needing to shift the phase of the received signals 20-30 degrees.

Another embodiment which may be used when microphones 102 and 104 are separated sufficiently to cause large phase differences at the higher frequencies (typically above 1000 Hz.) being transduced includes adding a second phase shifter in parrallel with phase shifter 112 and a low pass filter connected to the output of one of the phase shifters and a high pass filter connected to the other. The outputs of the low and high pass filters are then summed at the inverting input of differential amplifier 114.

Having thus described the preferred embodiment of the present invention, the following is claimed as new and desired to be secured by Letters Patent:

1. A duplex communications apparatus comprising:
   speaker means for receiving and responding to incoming audio signals from a source thereof for producing corresponding speaker sounds;
   first and second microphone means each operable for receiving and responding to said speaker sounds and to other sounds from outside said apparatus for producing respectively corresponding audio signals;
   means for positioning said first and second microphone means so that the audio signals representative of said speaker sounds of said first microphone means relative to the audio signals representative of said speaker sounds of said second microphone means present a ratio;
   amplifier means coupled with first and second microphone means for receiving and amplifying said audio signals according to respective first and second gains for producing respectively corresponding first amplified signals including first amplified speaker sounds signals and first amplified other sounds signals, and second amplified signals including second amplified speaker sounds signals and second amplified other sounds signals,
   said amplifier means including means for providing said gains so that said second gain relative to said first gain presents said ratio so that said first and second amplified speaker sounds signals are substantially equal and thereby present a common speaker mode between said first and second amplified signals; and
   means for receiving and responding to said first and second amplified signals for rejecting any common mode therebetween in order to produce output signals substantially free of said common speaker mode and thereby representative of said other sounds.

2. The apparatus as set forth in claim 1, further including a high pass filter coupled with said means for receiving and responding to said first and second amplified signals and a low pass filter coupled with said high pass filter for eliminating the low and high frequency resonating characteristics of said speaker means.

3. The apparatus as set forth in claim 2, further including an automatic level control circuit connected to the output of said low pass filter and a line driver circuit connected to the output of said automatic level-control circuit.

4. The apparatus as set forth in claim 1, said speaker means including:
   a speaker;
   an amplifier circuit coupled with said speaker for driving said speaker; and
   an automatic level control circuit coupled with said amplifier circuit.

5. The apparatus as set forth in claim 1, said speaker signal source including a telephone line.

6. The apparatus as set forth in claim 1, said first and second microphone means including electret microphones.

7. The apparatus as set forth in claim 6 wherein said first electret microphone is smaller than said second electret microphone.

8. The apparatus as set forth in claim 1, said first microphone means being positioned on a plane parallel to and in front of a frontal plane of said speaker means.

9. The apparatus as set forth in claim 8 wherein said speaker means includes a speaker cone, said first microphone means and second microphone means are positioned such that each lies on an axis generally perpendicular to the speaker means frontal plane and passing through essentially the center of the speaker cone wherein said second microphone means is placed further from said speaker cone relative to said first microphone means.

10. The apparatus as set forth in claim 9, said first microphone means being positioned less than an inch in front of the frontal plane.

11. The apparatus as set forth in claim 1, said amplifier means including a differential amplifier.

12. The apparatus as set forth in claim 1 wherein said first gain is approximately 100 and said second gain is approximately 400.

13. The apparatus as set forth in claim 1, said means for receiving and responding to said first and second amplified signals including a differential amplifier coupled with said amplified signals wherein an output of said differential amplifier produces signals free of said common speaker mode.

14. The apparatus as set forth in claim 1, further including phase shift means coupled with the output of one of said amplifier means for shifting the phase of said corresponding amplified speaker sounds signals into phase with the amplified speaker sounds signals from the other of said amplified means.

15. The apparatus as set forth in claim 1, said means for receiving and responding including a differential amplifier.

* * * * *